(12) United States Patent
Suresh et al.

(10) Patent No.: US 9,767,237 B2
(45) Date of Patent: Sep. 19, 2017

(54) TARGET CAPTURE AND REPLAY IN EMULATION

(71) Applicant: Mentor Graphics Corporation, Wilsonville, OR (US)

(72) Inventors: Krishnamurthy Suresh, Noida (IN); Satish Kumar Agarwal, Giridih (IN); Sanjay Gupta, Noida (IN); Charles W. Selvidge, Oakland, CA (US)

(73) Assignee: Mentor Graphics Corporation, Wilsonville, OR (US)

( * ) Notice: Subject to any disclaimer, the term of this patent is extended or adjusted under 35 U.S.C. 154(b) by 0 days.

(21) Appl. No.: 14/941,460

(22) Filed: Nov. 13, 2015

(65) Prior Publication Data

US 2017/0140082 A1    May 18, 2017

(51) Int. Cl.
    *G06F 17/50*    (2006.01)
(52) U.S. Cl.
    CPC ................ *G06F 17/5027* (2013.01)
(58) Field of Classification Search
    USPC ........................................ 716/106
    See application file for complete search history.

(56) References Cited

U.S. PATENT DOCUMENTS

| | | |
|---|---|---|
| 5,815,688 A | 9/1998 | Averill |
| 6,263,302 B1 | 7/2001 | Hellestrand et al. |
| 6,539,503 B1 | 3/2003 | Walker |
| 6,934,832 B1 | 8/2005 | Van Dyke et al. |
| 2002/0101824 A1* | 8/2002 | Ziedman ............ G06F 17/5022 370/241 |
| 2003/0154342 A1 | 8/2003 | Southwell et al. |
| 2005/0114113 A1* | 5/2005 | Quayle ............... G06F 17/5022 703/25 |
| 2006/0015313 A1* | 1/2006 | Wang .................. G06F 17/5027 703/14 |
| 2006/0253762 A1* | 11/2006 | Schalick .......... G01R 31/31704 714/742 |
| 2008/0167854 A1 | 7/2008 | Gupta et al. |
| 2008/0216073 A1 | 9/2008 | Yates et al. |
| 2010/0114915 A1 | 5/2010 | Gorton, Jr. |
| 2010/0115494 A1 | 5/2010 | Gorton, Jr. |
| 2011/0126219 A1 | 5/2011 | Singh et al. |
| 2011/0184717 A1* | 7/2011 | Erickson ............ G06F 17/5027 703/28 |

(Continued)

OTHER PUBLICATIONS

May 8, 2017—U.S. Non-Final Office Action—U.S. Appl. No. 14/941,471.

*Primary Examiner* — Mohammed Alam
(74) *Attorney, Agent, or Firm* — Banner & Witcoff, Ltd.

(57) ABSTRACT

An emulation process is performed with an emulator coupled to one or more targets. During a part or a whole of the emulation process, input signals to the emulator from the one or more targets are being captured, streamed out of the emulator and stored in one or more processor-readable media. The part or the whole of the emulation process is then repeated with the emulator decoupled to the one or more targets. During the repeating, the input signals stored in the one or more processor-readable media are being streamed back to the emulator. The streaming in both of the capture and replay modes may be through interfaces designed for small packets of data and fast streaming speed.

20 Claims, 3 Drawing Sheets

Flow chart 300

(56) References Cited

U.S. PATENT DOCUMENTS

| | | |
|---|---|---|
| 2011/0185241 A1* | 7/2011 | Erickson ............. G06F 11/3632 714/724 |
| 2012/0159513 A1 | 6/2012 | Pakhunov et al. |
| 2014/0052430 A1* | 2/2014 | Suresh ................ G06F 17/5027 703/14 |
| 2014/0082121 A1 | 3/2014 | Tune |
| 2015/0261590 A1 | 9/2015 | Sperber et al. |
| 2016/0283391 A1 | 9/2016 | Nilsson et al. |
| 2017/0052876 A1 | 2/2017 | Svensson et al. |

* cited by examiner

Flow chart
300

TARGET CAPTURE AND REPLAY IN EMULATION

FIELD OF THE DISCLOSED TECHNOLOGY

The present disclosed technology relates to the field of circuit design verification technology. Various implementations of the disclosed technology may be particularly useful for debugging in an in-circuit emulation environment.

BACKGROUND OF THE DISCLOSED TECHNOLOGY

Modern integrated circuit designs have become extremely complex. As a result, various techniques have been developed to verify that circuit designs will operate as desired before they are implemented in an expensive manufacturing process. For example, logic simulation is a tool used for verifying the logical correctness of a hardware design. Designing hardware today involves writing a program in the hardware description language. A simulation may be performed by running that program. If the program runs correctly, then one can be reasonably assured that the logic of the design is correct at least for the cases tested in the simulation.

Software-based simulation, however, may be too slow for large complex designs such as SoC (System on Chip) designs. Although design reuse, intellectual property, and high-performance tools all can help to shorten SoC design time, they do not diminish the system verification bottleneck, which consumes 60-70% of the design cycle. Hardware emulation provides an effective way to increase verification productivity, speed up time-to-market, and deliver greater confidence in final products. In hardware emulation, a portion of a circuit design or the entire circuit design is emulated with an emulation circuit or "emulator."

Two categories of emulators have been developed. The first category is programmable logic or FPGA(field programmable gate array)-based. In an FPGA-based architecture, each chip has a network of prewired blocks of look-up tables and coupled flip-flops. A look-up table can be programmed to be a Boolean function, and each of the look-up tables can be programmed to connect or bypass the associated flip-flop(s). Look-up tables with connected flip-flops act as finite-state machines, while look-up tables with bypassed flip-flops operate as combinational logic. The look-up tables can be programmed to mimic any combinational logic of a predetermined number of inputs and outputs. To emulate a circuit design, the circuit design is first compiled and mapped to an array of interconnected FPGA chips. The compiler usually needs to partition the circuit design into pieces (sub-circuits) such that each fits into an FPGA chip. The sub-circuits are then synthesized into the look-up tables (that is, generating the contents in the look-up tables such that the look-up tables together produce the function of the sub-circuits). Subsequently, place and route is performed on the FPGA chips in a way that preserves the connectivity in the original circuit design. The programmable logic chips employed by an emulator may be commercial FPGA chips or custom-designed emulation chips containing programmable logic blocks.

The second category of emulators is processor-based: an array of Boolean processors able to share data with one another is employed to map a circuit design, and Boolean operations are scheduled and performed accordingly. Similar to the FPGA-based, the circuit design needs to be partitioned into sub-circuits first so that the code for each sub-circuit fits the instruction memory of a processor. Whether FPGA-based or processor-based, an emulator performs circuit verification generally in parallel since the entire circuit design executes simultaneously as it will in a real device. By contrast, a simulator performs circuit verification by executing the hardware description code serially. The different styles of execution can lead to orders of magnitude differences in execution time.

An emulator typically has an interface system to communicate with a workstation server (workstation). The workstation provides the capability to load the DUV (design under verification, also referred to as DUT—design under test) model, controls the execution over time, and serves as a debugging interface into the DUV model on the emulator. The execution of these operations may require that the infrastructure clock of the emulator and thus the design clocks to be stopped.

The emulator may also have a stimulus or a co-modeling interface for communications between the DUV model and the test bench model running in the emulator and the workstation, respectively. This interface may also be used for debugging purposes. Due to software nature of operations in the workstation, communications through this interface during emulation often require slowing down or even temporarily suspending design clocks running in the emulator. This is particularly true for emulators used in a simulation acceleration environment or in a hardware/software co-verification environment.

In addition to communications with the workstation, other activities such as the need for multiple accesses to a hardware resource may also require slowing down or temporarily suspending design clock signals running in the emulator. For example, the design may need to read/write several locations of a design memory though a limited number of ports before the next associated design clock rising edge. In order to emulate these operations according to the design, the design clock signals may have to be suspended for a number of cycles of the emulator infrastructure clock signal.

Conflicting clock speed preferences may also exist between an emulator and its hardware targets. In an in-circuit-emulation (ICE) environment, an emulator models a part of a system and connects to real hardware that serves as another part of the system. The real hardware is often referred to as target(s). If a target is static, the emulator can temporarily suspend design clock signals. Emulation resumes normally after the slow speed of communication with the software environment is compensated and the design clock signals are restarted. A dynamic target, however, requires design clock signals to run continuously above a threshold speed. For example, PCI's lowest bus frequency is 33 MHz, which is even faster than the frequency (a few MHz) of a typical emulator infrastructure clock signal. The protocol may run into timeout errors if the clock signal associated with the PCIe bus is stopped for too long or is running at a speed too slow.

Conventionally, a speed-bridging device may be inserted between the emulator and the dynamic target to bridge the speed gap. Even with this device in place, there may still be a threshold speed (although more manageable now) above which the clock signal supplied to the dynamic target by the emulator has to run. One possible solution is to operate the emulator always run at the threshold speed. This solution, however, is usually impractical because a typical threshold speed is too slow. The technology of adaptive clock management, disclosed in U.S. patent application Ser. No. 14/087,531, which is incorporated herein by reference, is an approach that addresses this problem by slowing down the clocks only as much as needed to allow some of these operations that require clock stoppage while still achieving a good overall performance.

The currently available approaches, however, have limitations and may present a negative impact on the debug capability of an emulator. A typical debug strategy comprises employing hardware-triggered trace buffers to temporarily store captured design signal activity data. These trace buffers are circular buffers. Data associated with the most recent design cycle would necessarily replace the least recent one. The number of maximum cycles can be stored depends on the size of the memory and the design size. When a trigger is hit, the tracing stops (either immediately or after running some cycles) so that the user can look at what happened in the design around the trigger for debugging. The clock constraints associated with dynamic targets thus limit how much data can be captured and downloaded. Virtual or target-less emulation techniques may employed to overcome these limitations.

BRIEF SUMMARY OF THE DISCLOSED TECHNOLOGY

Aspects of the disclosed technology relate to techniques for capture and replay of signals communicating between an emulator and one or more targets. In one aspect, there is a method comprising: performing an emulation process using an emulator coupled to one or more targets, input signals to the emulator from the one or more targets being captured, streamed out of the emulator and stored in one or more processor-readable media during a part or a whole of the emulation process; and repeating the part or the whole of the emulation process using the emulator decoupled to the one or more targets, the repeating comprising streaming the input signals to the emulator from the one or more processor-readable media.

The one or more processor-readable media may be in a workstation. The one or more targets may comprise dynamic targets.

The input signals may be streamed out of the emulator through one or more interfaces designed for small packets of data and fast streaming speed during the performing the part or the whole of the emulation process. The input signals may also be streamed to the emulator through the one or more interfaces designed for small packets of data and fast streaming speed during the repeating the part or the whole of the emulation process.

The emulator may be configured to include adaptive clock management. The adaptive clock management may be used when the input signals are being streamed out of the emulator.

The performing may comprise capturing, streaming out of the emulator, and storing the output signals from the emulator to the one or more targets as reference output signals. The reference output signals may be compared with output signals from the emulator to the one or more targets generated during the repeating.

The repeating may further comprise: fetching data from the emulator by stopping an emulator infrastructure clock and design clocks.

In another aspect, there is a system comprising an emulator and a workstation coupled to the emulator, the emulator and the system configured to perform the above method.

Certain inventive aspects are set out in the accompanying independent and dependent claims. Features from the dependent claims may be combined with features of the independent claims and with features of other dependent claims as appropriate and not merely as explicitly set out in the claims.

Certain objects and advantages of various inventive aspects have been described herein above. Of course, it is to be understood that not necessarily all such objects or advantages may be achieved in accordance with any particular embodiment of the disclosed technology. Thus, for example, those skilled in the art will recognize that the disclosed technology may be embodied or carried out in a manner that achieves or optimizes one advantage or group of advantages as taught herein without necessarily achieving other objects or advantages as may be taught or suggested herein.

DETAILED DESCRIPTION OF THE DISCLOSED TECHNOLOGY

General Considerations

Various aspects of the present disclosed technology relate to techniques for capture and replay of signals communicating between an emulator and one or more targets. In the following description, numerous details are set forth for the purpose of explanation. However, one of ordinary skill in the art will realize that the disclosed technology may be practiced without the use of these specific details. In other instances, well-known features have not been described in details to avoid obscuring the present disclosed technology.

Some of the techniques described herein can be implemented in software instructions stored on a computer-readable medium, software instructions executed on a computer, or some combination of both. Some of the disclosed techniques, for example, can be implemented as part of an electronic design automation (EDA) tool. Such methods can be executed on a single computer or on networked computers.

The detailed description of a method or a device sometimes uses terms like "perform," and "repeat" to describe the disclosed method or the device function/structure. Such terms are high-level abstractions. The actual operations or functions/structures that correspond to these terms will vary depending on the particular implementation and are readily discernible by one of ordinary skill in the art.

Although the operations of the disclosed methods are described in a particular sequential order for convenient presentation, it should be understood that this manner of description encompasses rearrangements, unless a particular ordering is required by specific language set forth below. For example, operations described sequentially may in some cases be rearranged or performed concurrently. Moreover, for the sake of simplicity, the disclosed flow charts and block diagrams typically do not show the various ways in which particular methods can be used in conjunction with other methods.

Illustrative Emulation System

Figure 1A:
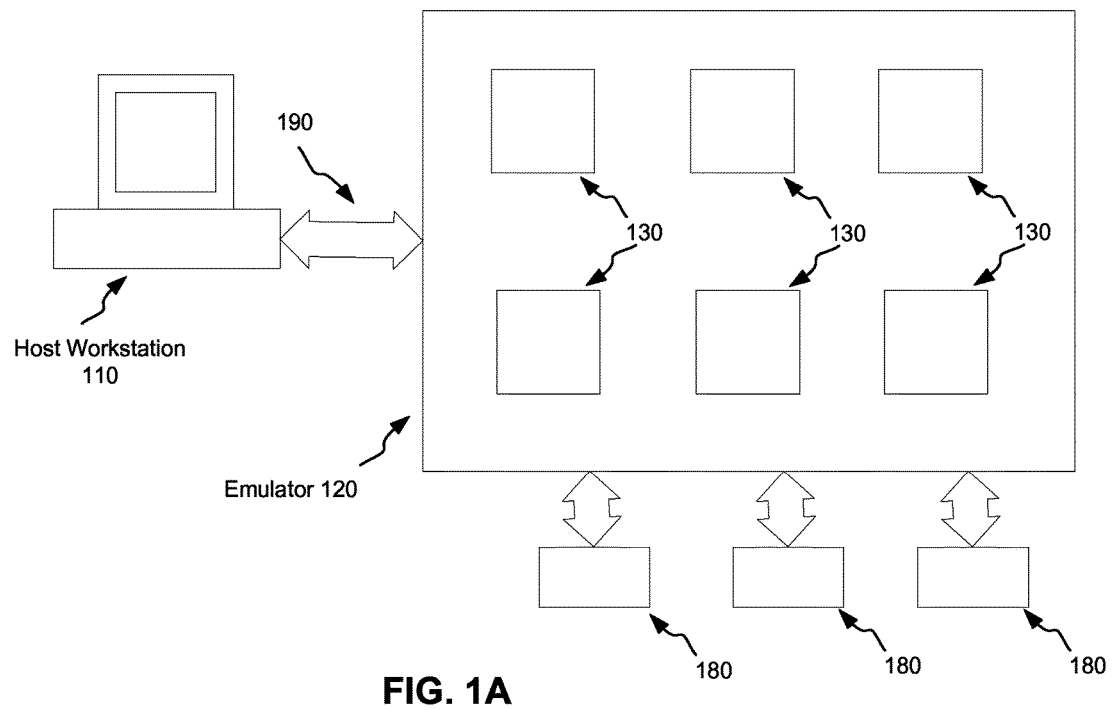
FIG. 1A shows an illustrative example of an emulation system with an emulator being coupled to targets.

FIG. 1A shows an illustrative example of an emulation system. As seen in this figure, the emulation system includes an emulator 120 coupled to a host workstation 110. The host workstation may be implemented by one or more computing systems. One computing system may include a single computer or multiple computers (e.g., a master computer and a plurality of slave computers). The emulator 120 includes multiple printed circuit boards (emulation circuit boards) 130. These emulation circuit boards 130 are networked (not shown). A circuit design may be partitioned by the host workstation 110 and loaded to the emulation circuit boards 130 for emulation.

One or more targets 180 are also coupled to the emulator 120 in FIG. 1A. The in-circuit emulation allows system-level and software testing prior to silicon availability. In some simple environments, a target may be a piece of test equipment that generates and verifies test data such as a network tester. As discussed previously, a target can be either a static target or a dynamic target, depending on whether design clock signals run in the emulator can be suspended or not.

Figure 1B:
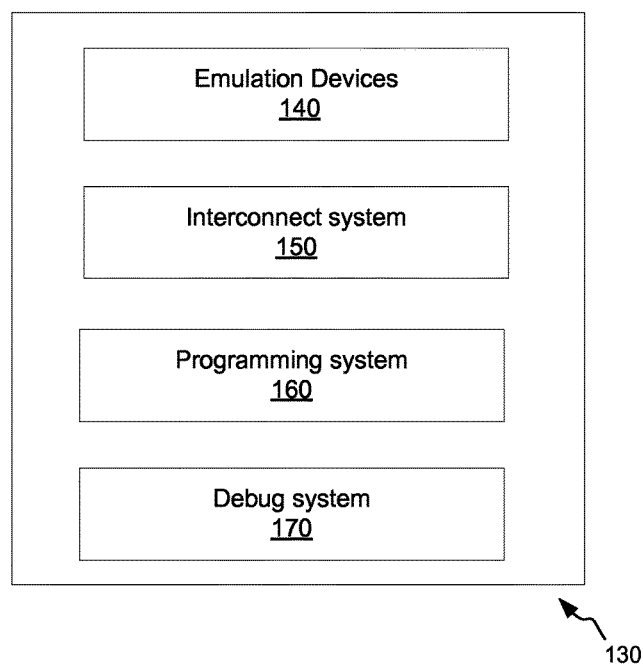
FIG. 1B shows an illustrative example of an emulation circuit board.

FIG. 1B illustrates an example of an emulation circuit board 130. The emulation circuit board 130 includes an array of emulation devices 140. The emulation devices 140 can be programmed to model, for example, combinatorial logic components, sequential circuit components and memories. The emulation devices 140 may be processor-based or FPGA-based.

Also included in the emulation circuit board 130 are an interconnect system 150, a programming system 160, and a debug system 170. The interconnect system 150 allows data to be moved between emulation devices 140. A portion of a circuit design on one emulation device may need data computed by another portion of the design on another emulation device. The programming system 160 enables a variety of other types of data to be brought in or out from an emulation device 140. Examples include programming data to configure an emulation device to perform a particular function, visibility data collected from the debug system 170 to be brought to the host workstation 110 for display, and content data either read from or written to memory circuitry in an emulation device 140. The debug system 170 enables the emulation system to monitor the behavior of a modeled circuit design. Needed data for visibility viewing purposes can be stored in the debug system 170. The debug system 170 may also provide resources for detecting specific conditions occurring in the circuit design. Such condition detection is sometimes referred to as triggering.

The emulator 120 is coupled to the host workstation 110 through an interface system 190. The interface system 190 comprises one or more interfaces. A typical interface is optimized to transport large amounts of data such as data containing the emulated circuit design model, initial contents of registers and design memories and data for debugging purposes. When this interface is in use, both the emulator infrastructure clock and the design clocks are typically stopped. This interface is, however, sub-optimal to transfer smaller sizes of data due to high fixed cost for every transfer.

With various implementations of the disclosed technology, the interface system may also comprise one or more interfaces designed for small packets of data and fast streaming speed. The speed may be, for example, in the order of 2-3 Giga bits per second. These interfaces may be employed during the capture mode, the replay mode, or both, as will be discussed in detail below. The communication may be performed through instrumented logic in the emulator model, which requires the emulator infrastructure clock keep running even though the design clocks can be stopped.

Figure 2:
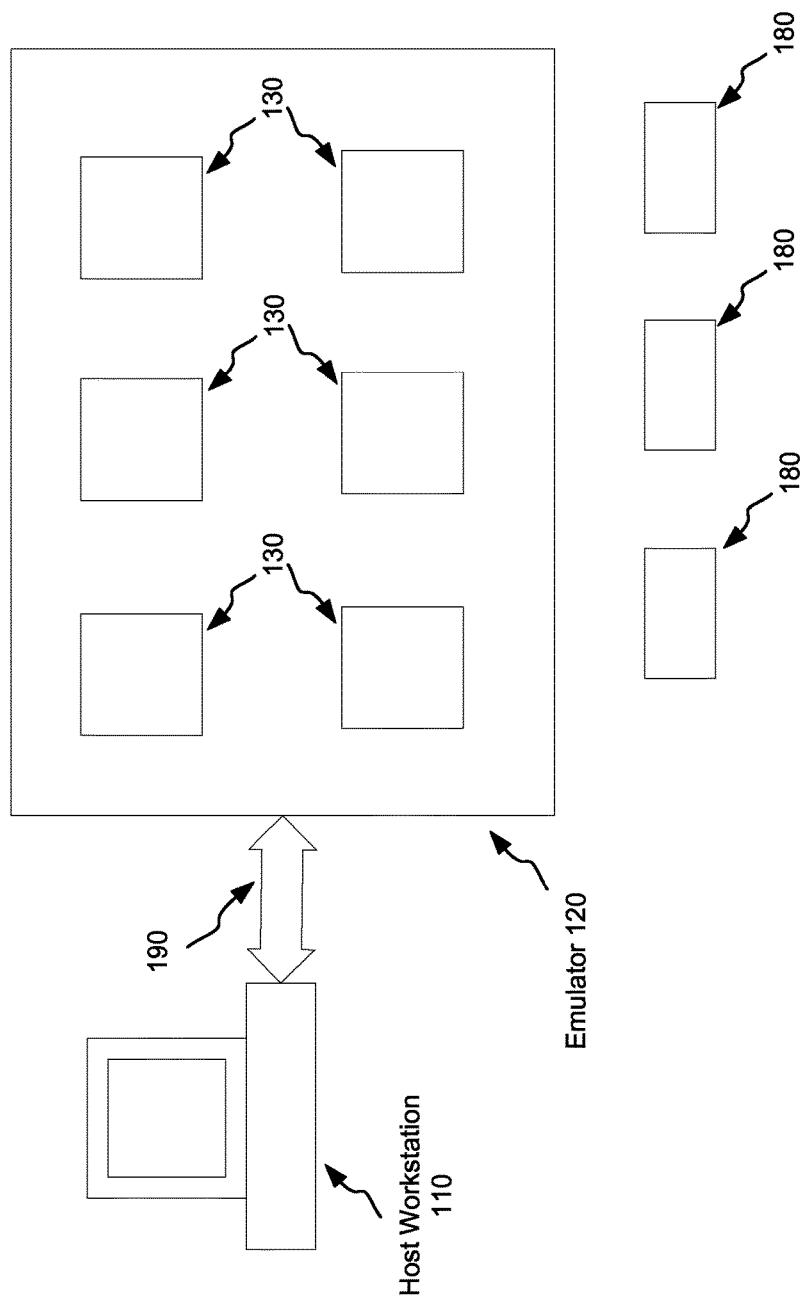
FIG. 2 shows an illustrative example of an emulation system with an emulator being decoupled to targets.

FIG. 2 illustrates an example of the emulator 120 being decoupled from the one or more targets 180. This configuration may be used in the replay mode according to various embodiments of the disclosed technology. As will be discussed in detail below, captured stimuli of the targets will be transported to the emulator 120 through the one or more interfaces designed for small packets of data and fast streaming speed.

It should also be appreciated that the emulation system in FIGS. 1A and 2, and the emulation circuit board 130 in FIG. 1B are illustrated as examples only, and they are not intended to be limiting. Various embodiments of the disclosed technology may be implemented using only a subset of the components illustrated in the figures, or include an alternate combination of components, including components that are not shown in the figures. For example, there are may be only one target present. The one or more targets may include one or more static targets, which do not need to be decoupled from the emulator 120. It should also be appreciated that the decoupling does not necessarily mean that there are no physical connections. Even if a target is physically connected to the emulator, they are still decoupled if there is no electrical communication between them.

Capture And Replay

Figure 3:
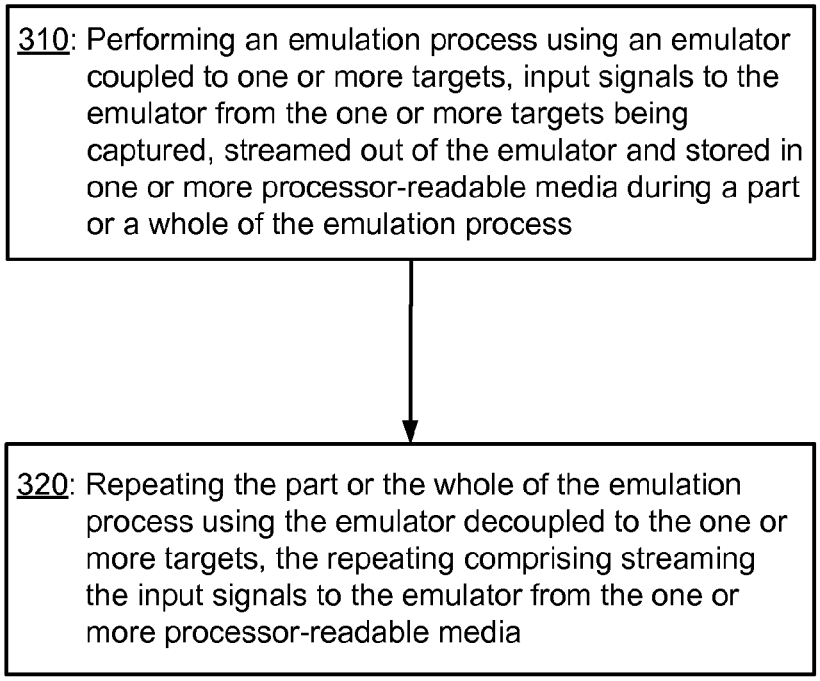
FIG. 3 illustrates a flow chart describing methods for capture and replay of signals communicating between an emulator and one or more targets that may be employed by various embodiments of the disclosed technology.
Figure 3:

FIG. 3 illustrates a flow chart 300 describing methods for capture and replay of signals communicating between an emulator and one or more targets that may be employed by various embodiments of the disclosed technology. For ease of understanding, the flow chart 300 will be described with reference to the emulator system illustrated in FIGS. 1A and 2. It should be appreciated, however, that alternate implementations of an emulator system may be used to perform the method of capture and replay of signals communicating between an emulator and one or more targets shown in the flow chart 300 according to various embodiments of the disclosed technology. In addition, it should be appreciated that implementations of the emulator system illustrated in FIGS. 1A and 2 may be employed with other methods of capture and replay of signals communicating between an emulator and one or more targets according to different embodiments of the disclosed technology.

In operation 310 of the flowchart 300, an emulator coupled to one or more targets performs an emulation process. During a part or a whole of the emulation process, input signals to the emulator from the one or more targets are captured, streamed out of the emulator and stored in one or more processor-readable media. An example of the emulator system is shown in FIG. 1A. The one or more targets may comprise dynamic target(s).

In this application, streaming means sending data in a continuous or packetized form without stopping design clocks. Design clocks are clocks in the circuit design. The circuit design is represented by a verification model in the emulator. In some embodiments of the invention, the adaptive clock management disclosed in the above mentioned U.S. patent application Ser. No. 14/087,531 may be employed during the streaming. The adaptive clock management slow down or temporarily suspend design clocks based on slack information associated with dynamic targets coupled to the emulator.

The streaming may use an interface designed for small packets of data and fast streaming speed. A typical packet size is between 500 bits and 2000 bits, suitable for such an interface. Multiple interfaces may be used in parallel for increased bandwidth and throughput. Even so, controlled slowing down of design clocks, (e.g. by using the adaptive clock management) may be needed for the streaming in some situations.

The data of the input signals streamed out may be compressed before storing in the one or more processor-readable media. The one or more processor-readable media may be in the workstation coupled to the emulator. The compression and storing (writing) may be operated in parallel by use of multiple threads.

In addition to the input signals to the emulator from the one or more targets, output signals from the emulator to the one or more targets may also be captured, streamed out and stored. The output signals may be used as reference data for checking whether the target-less replay in the next operation executes correctly.

To replay a part of the emulation process, a checkpoint may be established. The establishment of a checkpoint involves capturing the operational state of the design at a particular time point and storing it onto a storage medium. The operational state may include register configurations, memory contents, et al.

Multiple checkpoints may be needed so that multiple parts of the emulation process could be replayed for various applications. A typical debugging process starts close to a point where a problem is observed. Debugging information near that point needs to be fetched for analysis. The analysis is usually a cause and effect analysis. To analyze a resulting design behavior at a given time, design behavior at a previous time which caused it is investigated. This backward tracing operation may continue multiple times. When the previous checkpoint is hit and more information is still needed, a replay starting from a further previous checkpoint can be performed. This is more efficient compared to starting from the very beginning The streamed-out data may be annotated with markers associated with the checkpoints.

In operation 320, the emulator decoupled to the one or more targets repeats the part or the whole of the emulation process. FIG. 2 illustrates an example of an emulation system for performing the repeating. During the repeating, the stored input signals are streamed back to the emulator from the one or more processor-readable media. This may be accomplished by configuring the logic in the emulator connected to the targets to receive the stored data. The interface designed for small packets of data and fast streaming speed may be employed for the streaming. To repeat the part of the emulation process, the state of the emulated design model needs to be restored to the operational state at the starting point of the part. If a checkpoint is used as discussed above, the operational state data stored for the checkpoint may be used to configure the emulator.

During the repeating, various types of data can be transferred out of the emulator. Waveforms of design signals in locations of interest, assertion information, and functional coverage information are three examples. The first two types of data are important for debugging. The target-less repeating allows a large amount of these data be captured, stored and fetched by stopping both the emulator infrastructure clock and the design clocks frequently or periodically. Full waveforms provide with good visibility of design activities in the relevant time window.

As discussed previously, the output signals from the emulator to the one or more targets may be stored as reference data in operation 310. In operation 320, output signals from the emulator to the one or more targets may be streamed out and compared with the reference data. This helps to ensure repeats the part or the whole of the emulation process is repeated properly.

In addition to debugging, the replay performed in operation 320 can be used for a variety of other applications such as power estimation and software-hardware co-debugging. In a software-hardware co-debugging process, a CPU (central processing unit) is emulated and the activities of a CPU are traced. In addition, the emulated design activity which may involve the bus and peripheral activities associated with the CPU is also captured as waveforms. A CPU fast ISS model is then run in the workstation to recreate the CPU activities based on the trace data. This, combined with the captured waveforms, establishes a software-hardware co-debugging environment in a post-process mode. The disclosed technology enables this process works well when the CPU has one or more dynamic targets.

Power estimation typically relies on capturing complete design activity traces for very long emulation runs. Also, power estimation on emulation models stimulated by real life activities provided by targets is expected to be more useful. The disclosed technology enables such power estimation. Power estimation may also focus on hot-spot time regions which are interesting from a power standpoint. A first light-weight or sparse design activity capture may first be performed to identify the hot spots, followed by a further more complete design activity capture around the identified hot spot time regions.

CONCLUSION

While the disclosed technology has been described with respect to specific examples including presently preferred modes of carrying out the disclosed technology, those skilled in the art will appreciate that there are numerous variations and permutations of the above described systems and techniques that fall within the spirit and scope of the disclosed technology as set forth in the appended claims. For example, while specific terminology has been employed above to refer to electronic design automation processes, it should be appreciated that various examples of the disclosed technology may be implemented using any desired combination of electronic design automation processes.

What is claimed is:

1. A method comprising:
   performing, using an emulator that is coupled to one or more targets and that is associated with a clock for infrastructure of the emulator and a clock for a circuit design under test by the emulator, a part of an emulation process;
   during the performing of the part of the emulation process:
      capturing, while running the clock for the infrastructure of the emulator and the clock for the circuit design, one or more input signals that are being communicated to the emulator from the one or more targets,
      communicating, while running the clock for the infrastructure of the emulator and the clock for the circuit design, the one or more input signals out of the emulator, and
      storing the one or more input signals in one or more processor-readable media;
   decoupling the emulator from the one or more targets;
   repeating, after the decoupling, the part of the emulation process; and
   during the repeating of the part of the emulation process, communicating, while running the clock for the infrastructure of the emulator and the clock for the circuit design, the one or more input signals to the emulator from the one or more processor-readable media.

2. The method recited in claim 1, wherein the one or more processor-readable media are in a workstation.

3. The method recited in claim 1, wherein communicating, while running the clock for the infrastructure of the emulator and the clock for the circuit design, the one or more input signals out of the emulator is performed via one or more interfaces designed for packets of data between 500 bits and 2000 bits and designed for a streaming speed between 2 and 3 gigabits per second.

4. The method recited in claim 3, wherein communicating, while running the clock for the infrastructure of the emulator and the clock for the circuit design, the one or more input signals to the emulator from the one or more processor-readable media is performed via the one or more interfaces designed for a packet of data between 500 bits and 2000 bits and designed for a streaming speed between 2 and 3 gigabits per second.

5. The method recited in claim 1, wherein the one or more targets comprises dynamic target.

6. The method recited in claim 1, further comprising:
slowing, while communicating the one or more input signals out of the emulator, the clock for the circuit design based on adaptive clock management.

7. The method recited in claim 6, further comprising:
temporarily suspending the clock for the circuit design based on the adaptive clock management.

8. The method recited in claim 1, further comprising:
capturing, communicating out of the emulator, and storing one or more reference output signals during the performing of the part of the emulation process.

9. The method recited in claim 8, further comprising:
comparing one or more output signals with the reference output signals during the repeating of the part of the emulation process.

10. The method recited in claim 1, further comprising:
fetching, during the repeating of the part of the emulation process, data from the emulator while the clock for the infrastructure of the emulator and the clock for the circuit design are stopped.

11. An emulator comprising:
a clock for infrastructure of the emulator;
a clock for a circuit design under test by the emulator; and
circuitry configured to perform a method comprising:
performing, when the emulator is coupled to one or more targets, a part of an emulation process;
during the performing of the part of the emulation process:
capturing, while running the clock for the infrastructure of the emulator and the clock for the circuit design, one or more input signals that are being communicated to the emulator from the one or more targets,
communicating, while running the clock for the infrastructure of the emulator and the clock for the circuit design, the one or more input signals out of the emulator, and
causing the one or more input signals to be stored in one or more processor-readable media;
decoupling the emulator from the one or more targets;
repeating, after the decoupling, the part of the emulation; and
during the repeating of the part of the emulation process, communicating, while running the clock for the infrastructure of the emulator and the clock for the circuit design, the one or more input signals to the emulator from the one or more processor-readable media.

12. The emulator recited in claim 11, wherein the one or more processor-readable media are in workstation in communication with the emulator.

13. The emulator recited in claim 11, wherein communicating, while running the clock for the infrastructure of the emulator and the clock for the circuit design, the one or more input signals out of the emulator is performed via one or more interfaces to the workstation designed for a packet of data between 500 bits and 2000 bits and designed for a streaming speed between 2 and 3 gigabits per second.

14. The emulator recited in claim 13, wherein communicating, while running the clock for the infrastructure of the emulator and the clock for the circuit design, the one or more input signals to the emulator from the one or more processor-readable media is performed via the one or more interfaces designed for a packet of data between 500 bits and 200 bits and designed for a streaming speed between 2 and 3 gigabits per second.

15. A method comprising:
performing, using an emulator that is coupled to one or more targets and that is associated with a clock for infrastructure of the emulator and a clock for a circuit design under test by the emulator, a part of an emulation process;
during the performing of the part of the emulation process:
capturing, while the clock for the infrastructure of the emulator is running and the clock for the circuit design is stopped, one or more input signals that are being communicated to the emulator from the one or more targets,
communicating, while the clock for the infrastructure of the emulator is running and the clock for the circuit design is stopped, the one or more input signals out of the emulator, and
storing the one or more input signals in one or more processor-readable media;
decoupling the emulator from the one or more targets;
repeating, after the decoupling, the part of the emulation process; and
during the repeating of the part of the emulation process, communicating, while the clock for the infrastructure of the emulator is running and the clock for the circuit design is stopped, the one or more input signals to the emulator from the one or more processor-readable media.

16. The method recited in claim 15, wherein communicating, while the clock for the infrastructure of the emulator is running and the clock for the circuit design is stopped, the one or more input signals out of the emulator is performed via one or more interfaces designed for packets of data between 500 bits and 2000 bits and designed for a streaming speed between 2 and 3 gigabits per second.

17. The method recited in claim 16, wherein communicating, while the clock for the infrastructure of the emulator is running and the clock for the circuit design is stopped, the one or more input signals to the emulator from the one or more processor-readable media is performed via the one or more interfaces designed for a packet of data between 500 bits and 2000 bits and designed for a streaming speed between 2 and 3 gigabits per second.

18. The method recited in claim 15, further comprising:
slowing, while communicating the one or more input signals out of the emulator, the clock for the circuit design based on adaptive clock management.

19. The method recited in claim 18, further comprising:
stopping the clock for the circuit design by temporarily suspending the clock for the circuit design based on the adaptive clock management.

20. The method recited in claim 15, further comprising:
capturing, communicating out of the emulator, and storing one or more reference output signals during the performing of the part of the emulation process; and
comparing one or more output signals with the one or more reference output signals during the repeating of the part of the emulation process.

* * * * *